United States Patent [19]

Ehrlich

[11] 4,455,807

[45] Jun. 26, 1984

[54] SPLICE RAIL ASSEMBLY

[75] Inventor: Donald J. Ehrlich, Monon, Ind.

[73] Assignee: Evans Products Company, Portland, Oreg.

[21] Appl. No.: 383,241

[22] Filed: May 28, 1982

[51] Int. Cl.³ .............................................. E04B 1/60
[52] U.S. Cl. ....................................... 52/770; 52/464; 52/582; 52/584; 52/777
[58] Field of Search ................ 52/582, 777, 781, 770, 52/464, 584, 732, 730, 264; 403/364

[56] References Cited

U.S. PATENT DOCUMENTS

| | | | |
|---|---|---|---|
| 1,421,950 | 7/1922 | Kane | 52/464 |
| 2,073,673 | 3/1967 | Blake | 52/569 X |
| 2,394,443 | 2/1946 | Guignon, Jr. | 52/582 X |
| 2,808,136 | 10/1957 | Hammitt et al. | 52/770 |
| 2,948,362 | 8/1960 | Jones | 52/464 X |
| 3,081,851 | 3/1963 | Hubbard | 52/732 X |
| 3,136,395 | 6/1964 | Rebele | 52/731 |
| 3,380,210 | 4/1968 | Neal et al. | 52/582 |
| 3,788,682 | 1/1974 | Ehrlich | 52/264 X |
| 4,147,007 | 4/1979 | Eppich | 52/570 |

Primary Examiner—Alfred C. Perham
Assistant Examiner—David J. Thomas
Attorney, Agent, or Firm—Robert E. Howard

[57] ABSTRACT

A splice rail assembly for joining two adjacent panels in a coplanar relationship having two parallel tongues extending perpendicularly therefrom, the first of which tongues is located substantially in the mid-portion of the splice rail, the second being offset therefrom a distance substantially equal to the thickness of the first tongue. When two such rails are appropriately positioned with their tongues facing each other, the mid-portion tongues of each can be inserted into the space between the two tongues of the opposite rail in an interlocking relationship. The sides or ends of two panels fit, respectively, into the spaces formed between two such interlocked splice rails outwardly of the tongues and the resulting assembly can be fastened together with suitable fastening members.

5 Claims, 6 Drawing Figures

FIG. I
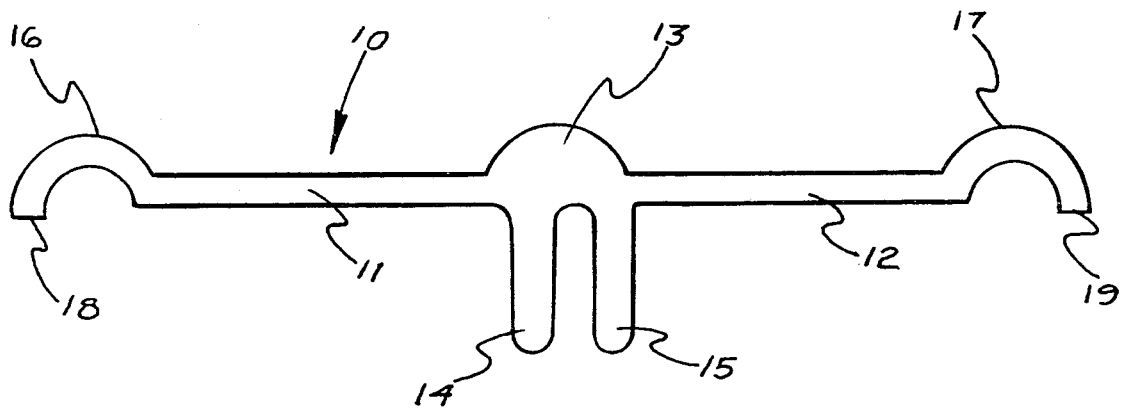
FIG. II
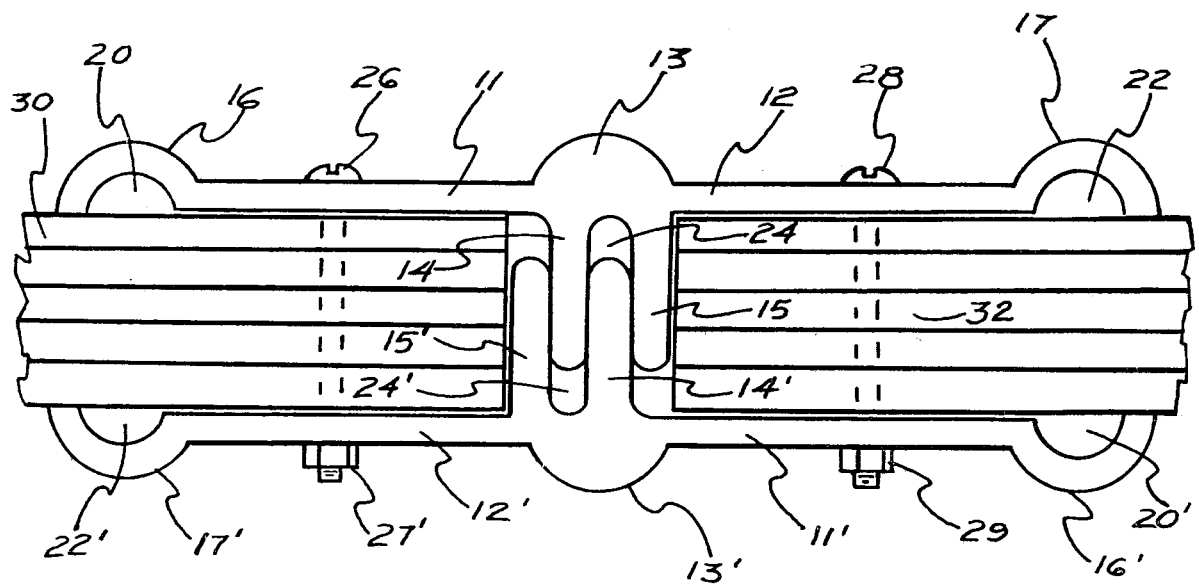

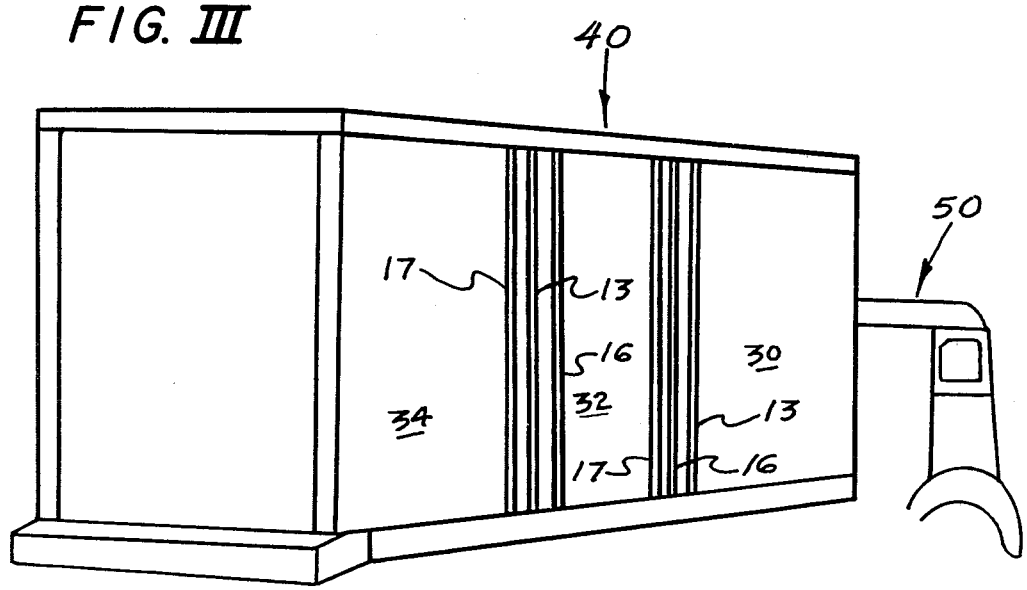
FIG. III
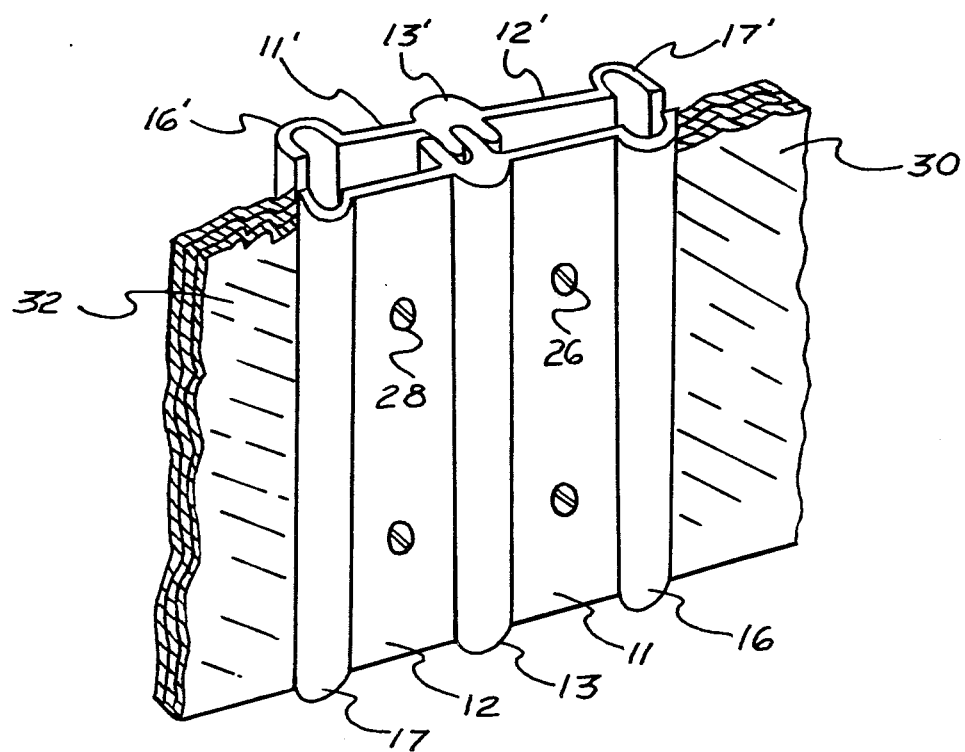
FIG. IV

FIG. V
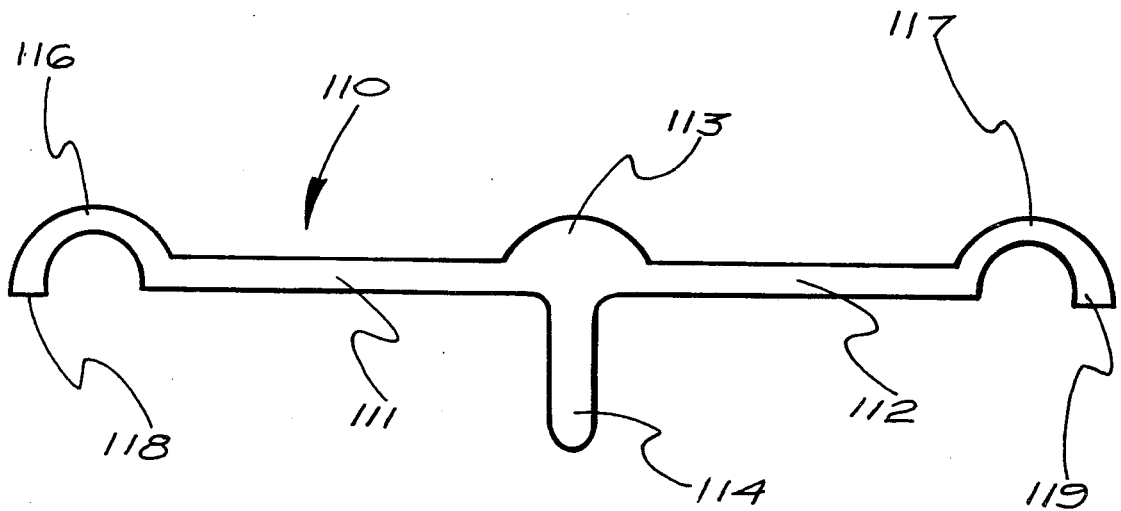
FIG. VI
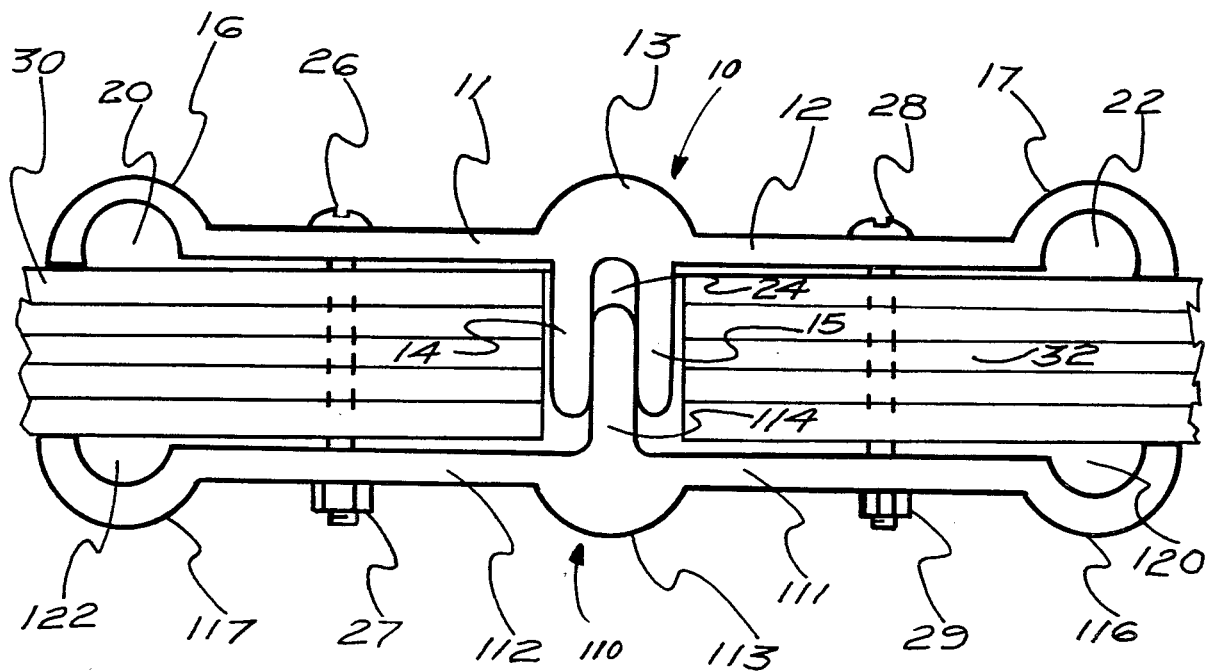

SPLICE RAIL ASSEMBLY

BACKGROUND OF THE INVENTION

This invention relates to a splice rail for splicing or joining together two panels. More particularly, the splice rail may be used to join together in a coplanar relationship two adjacent panels forming the sidewall of a trailer body.

The sidewalls of trailer bodies have been formed of many materials, including plywood. One of the most satisfactory materials for forming the sidewalls or side panels of a trailer body is a panel formed of a plywood core with coatings of glass fiber reinforced plastic on opposite sides thereof. Trailers formed from such panels are disclosed, for example, in U.S. Pat. Nos. 3,692,349 and 3,788,682.

Such panels are relatively large, being on the order of 10 feet by 40 feet. Although generally one such panel can form the entire sidewall of a trailer body, it is sometimes desirable to form sidewalls of a larger size. Also, it is desirable to repair trailer bodies that have been damaged in use by replacing only that portion of the sidewall containing the damage.

It is, therefore, an object of this invention to provide a splice rail for joining together two panels in a coplanar relationship which forms a spliced joint having superior strength characteristics.

It is another object of the present invention to provide a splice rail formed of a single configuration which can be used both on the inside and the outside of the splice joint between two panels.

SUMMARY OF THE INVENTION

The splice rail of the present invention comprises an elongated plate member having two parallel tongues extending perpendicularly from the inner face thereof. The first of the tongue members is located substantially in the mid portion of the splice rail with the second tongue member being offset therefrom a distance substantially equal to the thickness of the first tongue. When two such splice rails are assembled with their inner faces directed toward each other, the tongues of one splice rail will interlock with the tongues of the other splice rail, and with suitable fastening members forms a spliced joint capable of holding two adjacent panels together in a coplanar relationship.

BRIEF DESCRIPTION OF THE DRAWINGS

FIG. I is a cross sectional top view of the splice rail of the present invention.

FIG. II is a cross sectional top view of an assembly formed of two splice rails securing the sides or ends of two adjacent panels in a coplanar relationship.

FIG. III is a partial perspective view of the exterior of a trailer body illustrating the joining together of panels with the splice rail of the present invention.

FIG. IV is a cut away perspective side view of two panels joined together with the splice rail of the present invention.

FIG. V is a cross sectional top view of an alternative embodiment of the splice rail.

FIG. VI is a cross sectional top view of an assembly of splice rails of an alternative embodiment.

DETAILED DESCRIPTION OF THE PREFERRED EMBODIMENT

Referring now to FIG. I, the splice rail 10 of the present invention is shown in cross section. The splice rail 10 has two coplanar web portions 11 and 12 extending outwardly from a central body portion or rib 13. The longitudinal centerline of splice rail 10 is located along the center of rib 13.

Extending outwardly from the inner face of splice rail 10 are first and second tongue members 14 and 15, respectively. Tongues 14 and 15 extend perpendicularly from the inner face of splice rail 10 and are parallel to each other.

First tongue member 14 is located, substantially in the mid-portion of splice rail 10, and preferably the inner face of tongue 14 is located along the longitudinal centerline of splice rail 10.

Second tongue member 15 is offset from the longitudinal centerline of splice rail 10 a distance preferably substantially equal to the thickness of first tongue member 14.

Ribs 16 and 17 are located along each longitudinal edge, respectively, of splice rail 10. Ribs 16 and 17 are semi-circular in cross sectional configuration, with the inner faces thereof forming a longitudinally extending channels 20 and 22, respectively, as illustrated in FIG. II. The ends 18 and 19 of ribs 16 and 17, respectively, are not coplanar with the plane of the inner faces of webs 11 and 12, respectively, but extend inwardly a short distance beyond the plane of such inner faces. The apexes of the ribs 13, 16, and 17 are preferably in the same plane.

Referring to FIG. II, there is illustrated in cross section an assembly comprised of two identical splice rails 10 and 10' and two panels 30 and 32 joined or spliced together by such splice rails. The outer splice rail 10 is positioned opposite a second or inner splice rail 10' such that the longitudinal centerlines are parallel and located in the same plane perpendicular to the splice rails. In such a position, the first tongue 14 of splice rail 10 can be inserted into the space between the tongues 14' and 15' of the second splice rail 10' and the first tongue 14' of the second splice rail 10' can be inserted into the space between tongues 14 and 15 of the first splice rail 10. Since the space between the tongues is substantially equal to the thickness of the tongue of the opposite splice rail inserted therebetween, an interlocking relationship between the two splice rails 10 and 10' can be established.

A panel 30 fits into the space between the two splice rails 10 and 10' in the area formed between the inner faces of webs 11 and 12' and the outer face of tongue 15'. Similarly, a panel 32 may be inserted into the space between splice rails 10 and 10' in the area formed by the inner faces of webs 12 and 11' and the outer face of tongue 15.

Suitable fastening members, such as bolts 26 and 28, may be passed through plurality openings in the splice rails (not illustrated), and through the associated panels 30 and 32. Nuts 27 and 29 are attached to bolts 26 and 28 to complete the fastening of the splice rails to the panels. A plurality of such fastening members, such as illustrated in FIG. IV, may be located longitudinally along the splice rails in the web portions thereof.

By virtue of the fact that the tongues of two splice rails interlock in both directions, the fastening members are loaded in double shear which increases the integrity of the joint many times over that of a single type shear connection. Since the end portions 18 and 19 of ribs 16 and 17, respectively, extend inwardly a short distance beyond the planes of the inner surfaces of webs 11 and 12, a sealing relationship is established with the adjacent panel when the splice rail is assembled and the fastening members tightened as illustrated in FIG. II, thereby preventing moisture from entering.

Ribs 13, 16 and 17 project outward beyond fastening members 26 and 28 thereby protecting them from abrasion during operation of the trailer in which a spliced assembly is employed.

In FIG. III, an exterior view of a trailer body 40 pulled by a tractor 50 is illustrated which shows three panels, 30, 32 and 34 fastened or spliced together with two pairs of splice rails.

Although FIG. III illustrates employing the splice rail of the present invention in a vertical disposition, it is clear that the splice rail could also be employed in a horizontal or angular disposition as well.

An alternative embodiment of the present invention is illustrated in FIGS. V and VI.

Referring to FIG. V, the alternatively configured splice rail 110 is shown in cross section. The splice rail 110 has two coplanar web portions 111 and 112 extending outwardly from a central body portion or rib 113. The longitudinal center line of splice rail 110 is located along the center rib 113.

In contrast with splice rail 10 shown in FIG. I, splice rail 110 has a single tongue member 114 extending perpendicularly from the inner face thereof. Tongue member 114 is located in the longitudinal mid-portion of the inner face of splice rail 110.

FIG. VI illustrates, in cross section, an assembly of splice rails 10 and 110. As can be seen, single tongue member 114 of splice rail 110 is inserted into the space between tongues 14 and 15 of splice rail 10 and fastened together as previously explained to hold together two panels 30 and 32.

I claim:

1. In a trailer body having side walls formed of a plurality of panel members, the improvement in mechanically joining adjacent panel members comprising:
    a first splice rail comprising an elongated plate member having first and second tongue member extending outwardly in a longitudinal direction perpendicular the plane of said plate member, said first and second tongue members being parallel to each other, the inner face of the first of said tongue members being located along the longitudinal centerline of said plate member, the second of said tongue members being offset outwardly from the inner face of said first tongue member by a distance substantially equal to the thickness of said first tongue member,
    a second splice rail identical to said first splice rail and positioned adjacent to said first splice rail with the longitudinal centerlines of said first and second splice rails being parallel and located in the same plane perpendicular to said splice rails, the first tongue member of each of said first and second splice rails being located between the first and second tongue members of the other of said splice rails,
    the sides of ends of said adjacent panel members being located between said first and second splice rails outwardly of the second tongue member of each of said first and second splice rails, and
    a plurality of fastening members securing said first and second splice rails to said adjacent panel members.

2. The splice rail of claim 1 wherein said plate member has longitudinally extending first and second rib members along each longitudinal edge of said plate member, said first and second rib members projecting outwardly from the face of said plate member opposite the face of said plate member from which said first and second tongue members extend.

3. The splice rail of claim 1 wherein said place member has a third rib member extending longitudinally along the mid-portion of said plate member, said third rib member projecting outwardly from the same face of said plate as said first and second rib members.

4. The splice rail of claim 1 wherein the side of said first and second rib members facing the side of said plate member from which said tongues extend are each configured to form a longitudinally extending channel.

5. The splice rail assembly of claim 1 wherein each of said splice rails has a plurality of cooperating openings located outwardly of said second tongue member for receiving fastening members therethrough.

* * * * *